(12) United States Patent
Nijhuis et al.

(10) Patent No.: US 7,999,424 B2
(45) Date of Patent: Aug. 16, 2011

(54) ARRANGEMENT WITH AN ELECTRIC MOTOR AND A PUMP

(75) Inventors: Theo Nijhuis, Weerselo (NL); Mark Van Aarsen, Hengelo (NL)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/989,832

(22) PCT Filed: Apr. 14, 2009

(86) PCT No.: PCT/EP2009/054366
§ 371 (c)(1),
(2), (4) Date: Jan. 7, 2011

(87) PCT Pub. No.: WO2009/132956
PCT Pub. Date: Nov. 5, 2009

(65) Prior Publication Data
US 2011/0109175 A1    May 12, 2011

(30) Foreign Application Priority Data

Apr. 28, 2008  (EP) .................................. 08008142
Jun. 25, 2008  (EP) .................................. 08104540

(51) Int. Cl.
*H02K 9/00*  (2006.01)
(52) U.S. Cl. ........................................................ 310/58
(58) Field of Classification Search .................... 310/58, 310/59, 62, 63
See application file for complete search history.

(56) References Cited

U.S. PATENT DOCUMENTS

| | | | | |
|---|---|---|---|---|
| 5,605,045 A | * | 2/1997 | Halimi et al. ................. | 60/607 |
| 5,616,973 A | * | 4/1997 | Khazanov et al. ............ | 310/54 |
| 7,327,055 B2 | * | 2/2008 | Devine ........................... | 310/58 |
| 7,633,193 B2 | * | 12/2009 | Masoudipour et al. ........ | 310/54 |

FOREIGN PATENT DOCUMENTS

| | | |
|---|---|---|
| DE | 1114575 B | 10/1961 |
| DE | 20011219 U1 | 10/2000 |
| EP | 1826887 A2 | 8/2007 |
| WO | WO 0022358 A1 | 4/2000 |
| WO | WO 2004094833 A1 | 11/2004 |
| WO | WO 2007110281 A1 | 10/2007 |

\* cited by examiner

*Primary Examiner* — Nguyen N Hanh

(57) ABSTRACT

An arrangement including an electric motor driving a pump is provided. The arrangement is delivering a process fluid along a flow path, which flow path extends along a gap between a stator and a motor rotor of the electric motor. To avoid rotor dynamic instability caused by hydrodynamics in the gap flow, guiding elements are provided in the flow path.

7 Claims, 3 Drawing Sheets

ARRANGEMENT WITH AN ELECTRIC MOTOR AND A PUMP

CROSS REFERENCE TO RELATED APPLICATIONS

This application is the US National Stage of International Application No. PCT/EP2009/054366, filed Apr. 14, 2009 and claims the benefit thereof. The International Application claims the benefits of European Patent Office applications No. 08008142.5 EP filed Apr. 28, 2008 and 08104540.3 EP filed Jun. 25, 2008. All of the applications are incorporated by reference herein in their entirety.

FIELD OF INVENTION

The present invention relates to an arrangement with an electric motor and a pump driven by the electric motor, wherein a process fluid is moved by the pump to a higher pressure, wherein the electric motor comprises a stator and a rotor, which rotor is rotatable around a rotation axis, wherein the stator surrounds the rotor at least partially circumferentially, wherein a gap extends circumferentially between the rotor and the stator, wherein a flow path is provided, along which at least a part of the process fluid flows in an axial direction, wherein the gap belongs to the flow path.

BACKGROUND OF INVENTION

An arrangement of the incipiently mentioned type is known from electrically driven compressors, which are often designed as compact modules and sometimes enclosed in a common casing, which is preferably made gas tight. These modules are capable to compress for example toxic gases or can be operated in explosive environments or even under water due to their capability to be designed without seals. These sealess compressors receive a process fluid through a suction line and deliver it through a discharge line at a higher pressure level. Since the borderline between pumps and compressors is difficult to draw, to both types of machines is referred hereinafter as pumps.

One feature of the sealess design is that substantially all components in the common gas tight casing are surrounded by the process fluid. This involves the disadvantage that all these components must be designed to withstand the eventually chemically aggressive process medium. One advantage is the possibility to use the process fluid to cool components of the arrangement without providing a dedicated cooling system. A cooling of the electric motor's stator and of bearings for the rotor, for example magnetic bearings can be done with the process fluid.

However, the process fluid flowing through the gap between the rotor and the stator of the electric motor and cooling the stator and the rotor at least partially can lead to rotor dynamic instabilities due to certain flow phenomena. Process fluid entering the gap is accelerated into the direction of rotation of the rotor circumferentially. If the rotor is displaced with respect to the rotation axis the gap is narrowed radially and the process fluid has to accelerate according to continuity. Following the Bernoulli's law, pressure decreases, where acceleration occurs, which amplifies the displacement of the rotor and maybe also sets off parts of the stator, which are moved to narrow the gap further. If critical parameters are exceeded the stator and the rotor might get in contact and can be damaged.

SUMMARY OF INVENTION

It is therefore one object of the invention to improve the incipiently mentioned arrangement in such a way that the rotor dynamics are less declined by the fluid dynamics in the gap during operation. It is another object of the invention to avoid damages caused by the above described effect of hydrodynamically caused instability.

The solution for the above mentioned problem according to the invention is provided by an arrangement incorporating the features of the claims.

By inserting flow guiding elements into the flow path of the process fluid the flow distribution can be influenced in such a manner that circumferential speed is not taken up by the process fluid as quickly as without these elements. By reducing the circumferential acceleration the effect of radial displacement of the rotor with respect to the stator on the pressure distribution in the gap is reduced. The invention recognized that a higher circumferential speed of the process fluid increases the tendency of instability as a response to any excitation. Therefore, an arrangement according to the invention enables the operation of the motor at a higher rotation speed or with a smaller radial clearance of the gap or at a higher pressure respectively a higher density of the process fluid or even with a larger axial length of the gap, which give way to bigger motors. One substantial advantage of the invention is the reduced acceleration of the process fluid into the circumferential direction.

Another preferred embodiment of the invention is the installation of guide vanes in the flow path upstream of the gap, which are shaped to generate a counter swirls to the rotation direction before the fluid enters the gap. This way the fluid in the gap first has to be accelerated in the opposite direction to eliminate the counter swirl, during which acceleration process the fluid already can pass some axial distance.

A further preferred embodiment of the invention provides flow guiding elements on a surface of the stator adjoining the gap. Theses flow guiding elements are designed that the process fluid picks up circumferential speed less quickly. Theses flow guiding elements can be designed as longitudinal grooves extending along the rotation axis provided on this surface. The longitudinal grooves guide the flow in the axial direction and inhibit circumferential acceleration. Another possibility to shape the flow guiding elements is to provide the grooves with a helical shape, wherein the helix is left-handed for a right turning rotor and right handed for a left turning rotor, so that a flow following the helix is directed counterwise the rotor rotation. This way an axial pressure difference forces the flow to passage the gap axially picking up less circumferential speed.

The problems solved by the invention are most likely to occur in an arrangement, wherein the electric motor and the pump are enclosed by a common gas tight casing, which is provided with an inlet and an outlet for the process fluid.

In such an arrangement the process fluid can circulate through the gap of the electric motor when no seals are used to prevent this.

To make an arrangement according to the invention suitable for high performance application a dedicated cooling system can be provided for the stator, which is separated from the gap by an adjoining partition wall. This wall can be of cylindrical shape and needs to be capable of high mechanical load due to pressure differences between the process fluid and the cooling fluid and furthermore the wall should not be electrically conductive since otherwise eddy currents might generate further thermal load. Hence the material choice for such a partition wall is very limited, which increases the need for an arrangement according to the invention lowering the mechanical load on such a partition wall.

BRIEF DESCRIPTION OF THE DRAWINGS

The above mentioned attributes and other features and advantages of this invention and the manner of attaining them will become more apparent and the invention itself will be better understood by reference to the following description of the currently best known mode of carrying out the invention taken in conjunction with the accompanying drawings, wherein.

DETAILED DESCRIPTION OF INVENTION

Figure 1:
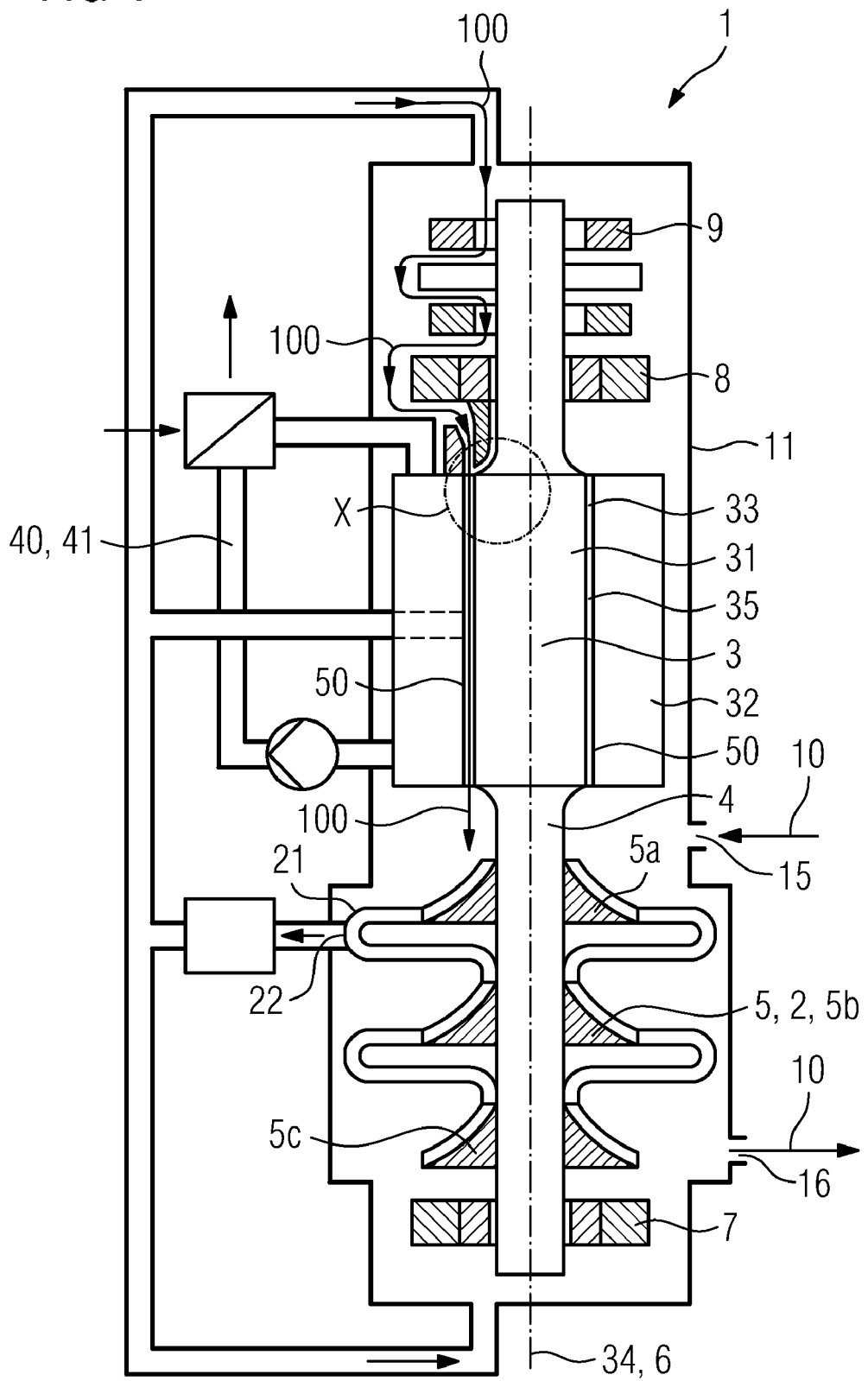
FIG. 1 shows a schematic depiction of a cross section of an arrangement according to the invention.

FIG. 1 shows an arrangement 1 according to the invention comprising a compressor respectively a pump 2 and an electric motor 3 driving a common rotor 4, which is supporting impellers 5 of the pump 2. The rotor 4 rotates around a vertical rotation axis 6 and is supported by two radial bearings 7, 8 and an axial bearing 9. The bearings 7, 8, 9 are magnetic bearings, which are encapsulated to prevent contact between a process fluid 10 and their internals.

The bearings 7, 8, 9, the pump 2 and the electric motor 3 are surrounded by a common gas tight casing 11. The casing 11 is provided with an inlet 15 and an outlet 16, which inlet is connected to a non further depicted suction line and which outlet is connected to a non further depicted discharge line, through which the process fluid 10 enters respectively leaves the casing 11. In the casing the fluid flows along a flow path 100, which can be diverted several times.

The pump 2 delivers the process fluid 10 to a higher pressure level within its three impellers 5 (first 5a, second 5b, third 5c).

A cross over connection 21 between the first impeller 5a and the second impeller 5b is provided with an extraction 22, through which process fluid is kept for cooling purpose. The extraction 22 is connected to locations of the machine, where cooling is needed, namely the bearings 7, 8, 9 and the electric motor 3.

The electric motor 3 comprises a motor rotor 31 and a stator 32. The stator 32 is provided with a cylindrical borehole 33 through which the motor rotor 31 extends along a rotation axis 6. The inner surface of the stator 32, respectively the borehole 33 adjoints a circumferential gap 35 between the motor rotor 31 and the stator 32. The gap 35 is part of the flowpath 100, which is a substantial feature for the invention.

The stator 32 has a dedicated cooling system 40, through which a cooling fluid 41 circulates in a closed loop.

As depicted in detail X (shown in FIG. 2) a partition wall 50 separates the stators 32 internals from the gap 35, through which process fluid 10 is flowing.

Figure 2:
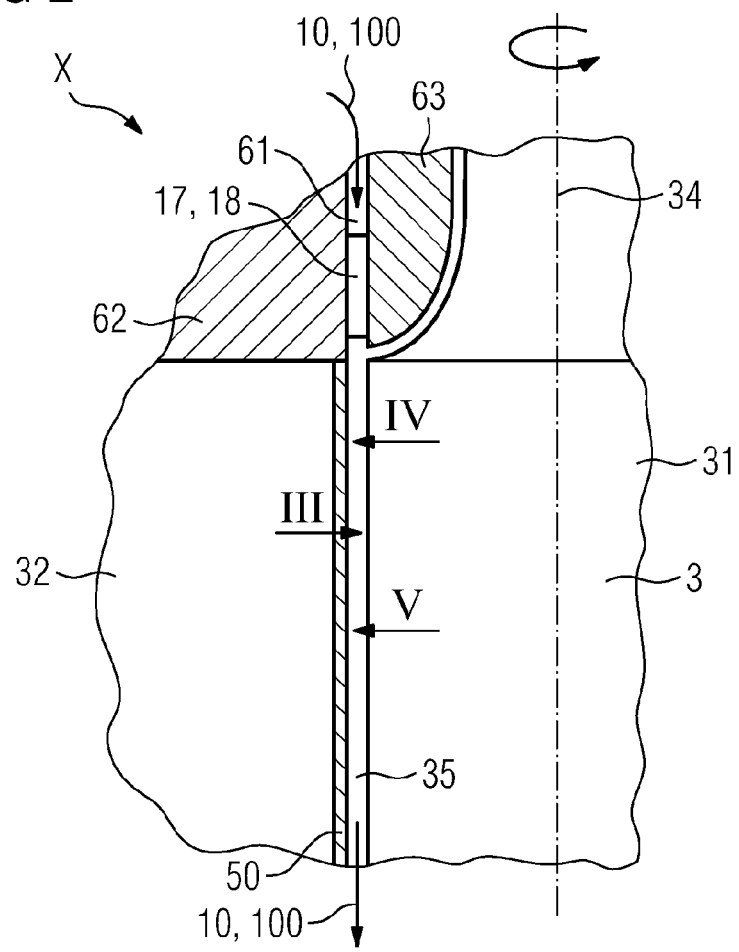
FIG. 2 shows a detail X of FIG. 1, FIGS. 3-5 show flow guiding elements according to the invention in perspectives indicated in FIG. 2, wherein the indicators with roman numbering in FIG. 2 correspond to the numbers of the figures.
Figure 3:
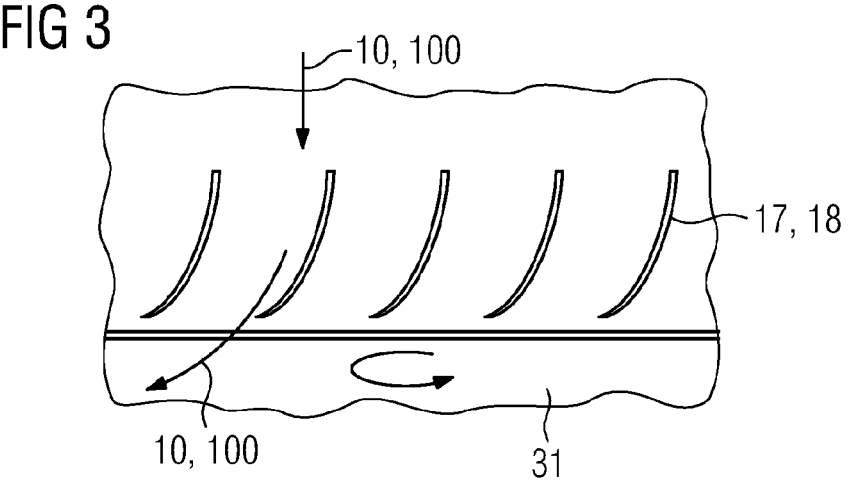

In the FIGS. 2-5 the direction of rotation ROT is indicated by an arrow referenced with ROT respectively. Before the process fluid 10 enters the gap 35 between the motor rotor 31 and the stator 32 it passes a static channel 61 between two static parts 62, 63. This static channel 61 is provided with a plurality of inlet guide vanes 65, which are shaped in such a way, that a counter swirl with respect to the direction of rotation ROT is generated in the fluid 10 flow before entering the gap 35 (shown in FIG. 3 depicting the view A-A of FIG. 2).

Figure 4:
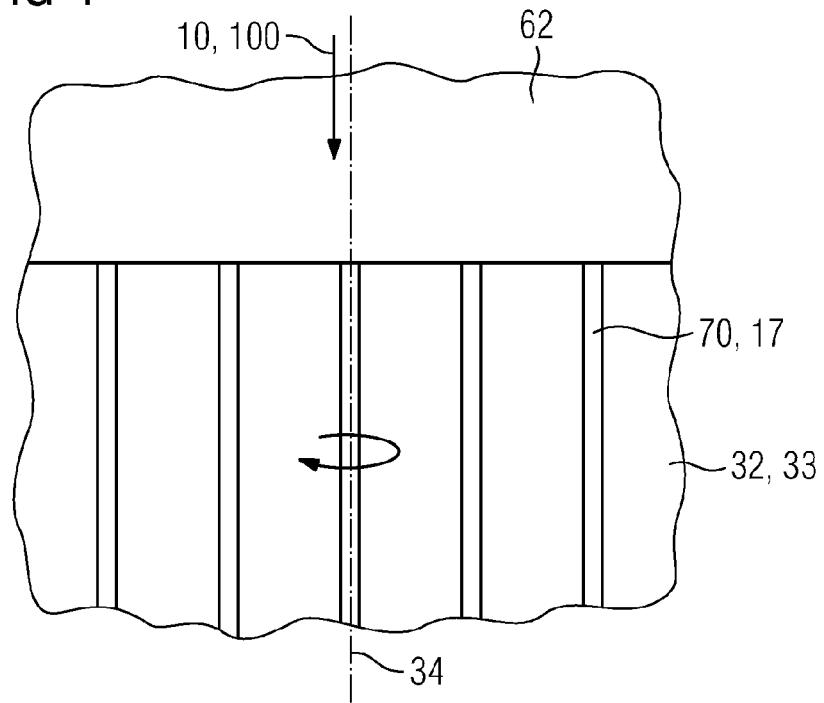
Figure 5:
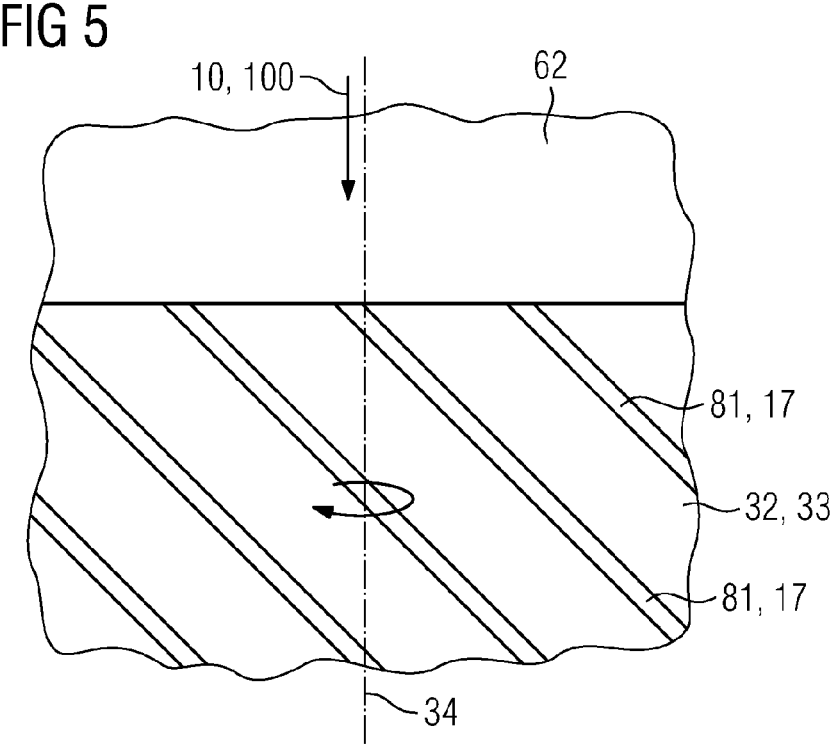

FIG. 4 and FIG. 5 show views B-B respectively, which are indicated in FIG. 2. Both figures show the inner surface of the borehole 33 of the stator 32 and the adjoining static element 52. The borehole 33 in FIG. 2 is provided with longitudinal grooves extending along the rotation axis 34, so that the fluid 10 flow is inhibited to pick up circumferential speed in the direction of the rotation ROT of the motor rotor 31. The grooves 70 are directing the fluid 10 flow into the axial direction.

FIG. 5 shows helical grooves 81 provided on the inner surface of the borehole 33 of the stator 32. With respect to the direction of the fluid 10 flow the helical grooves 81 direct the flow counterwise the rotation ROT direction of the motor rotor 31 due to their inclination to the rotation axis 34. For a left rotating rotor 4 a right handed helix of the helical grooves 81 is provided and vice versa.

The invention claimed is:

1. An arrangement, comprising:
   an electric motor, comprising:
      a stator, and
      a motor rotor;
   a pump, driven by the electric motor; and
   a plurality of flow guiding elements,
   wherein a process fluid is moved by the pump to a higher pressure,
   wherein the motor rotor is rotatable around a rotation axis,
   wherein the stator surrounds the motor rotor at least partially circumferentially,
   wherein a gap extends circumferentially between the motor rotor and the stator,
   wherein a flow path is provided, along which at least a part of the process fluid is directed in an axial direction,
   wherein the gap belongs to the flow path,
   wherein in the flow path the plurality of flow guiding elements are provided in order to avoid a flow in the circumferential direction of rotor rotation in the gap, and
   wherein the plurality of flow guiding elements are guide vanes installed in the flow path upstream the gap and which are shaped to generated a counter swirl to the direction of rotor rotation before the process fluid enters the gap.

2. The arrangement as claimed in claim 1, wherein a surface of the stator adjoining the gap is provided with the plurality of flow guiding elements.

3. The arrangement as claimed in claim 2, wherein the surface is provided with a plurality of longitudinal grooves extending along the rotation axis.

4. The arrangement as claimed in claim 2,
   wherein the surface is provided with a plurality of grooves of a helical shape, and
   wherein the helix is left handed for a right turning rotor and right handed for a left turning rotor.

5. The arrangement as claimed in claim 1, wherein the electric motor and the pump are enclosed by a common gas tight casing, which is provided with an inlet and an outlet for the process fluid.

6. The arrangement as claimed in claim 1, wherein the stator includes a dedicated cooling system, which is separated from the gap by an adjoining partition wall.

7. The arrangement as claimed in claim 6, wherein the adjoining partition wall is of a cylindrical shape.

* * * * *